March 25, 1969   J. D. TRONCALE, SR   3,434,690
ELECTRICALLY OPERATED FLUID CONTROL VALVE
Filed July 20, 1965

JOSEPH D. TRONCALE, SR.
INVENTOR.

BY
ATTORNEY

United States Patent Office 3,434,690
Patented Mar. 25, 1969

3,434,690
ELECTRICALLY OPERATED FLUID
CONTROL VALVE
Joseph D. Troncale, Sr., Arcadia, Calif.
(1518 N. Spring St., Los Angeles, Calif. 90012)
Filed July 20, 1965, Ser. No. 473,361
Int. Cl. F16k 31/365, 31/42
U.S. Cl. 251—30     17 Claims This invention relates to fluid control valves and more particularly to electrically operated fluid control devices.

Heretofore fluid control valves in general use normally created an amount of noise such as line chattering and thumping during the operation cycles thereof. This was true whether the control valves were mechanically, hydraulically or electrically operated.

Further, prior fluid control valves were relief-drained into the atmosphere externally of the valve, thereby requiring an additional means for removing the fluid once it reached the atmosphere outside the valve. In the present invention, this problem is uniquely solved by feeding the relief drain fluid from the upper chamber into the lower chamber of the valve and subsequently into the main line without having to pass the same into the atmosphere outside the valve.

Another unique feature of the present invention is an accumulation chamber which is interconnected with the lower valve chamber and the main line by the relief drain passageway. The accumulation chamber greatly decreases the response time between the initial activation of the valve control and the reaction of the valve thereto.

Accordingly, it is an object of the present invention to provide a noiseless electrically operated fluid control valve.

A further object is to provide a fluid control valve having a very short response time between the initial activation of the valve control and the reaction of the valve.

Still another object of the invention is to provide a fluid control valve capable of activation by mechanical, hydraulical and electrical means.

Other objects and advantages of the invention will become apparent from the following description taken in conjunction with the accompanying drawings in which.

Figure 1:
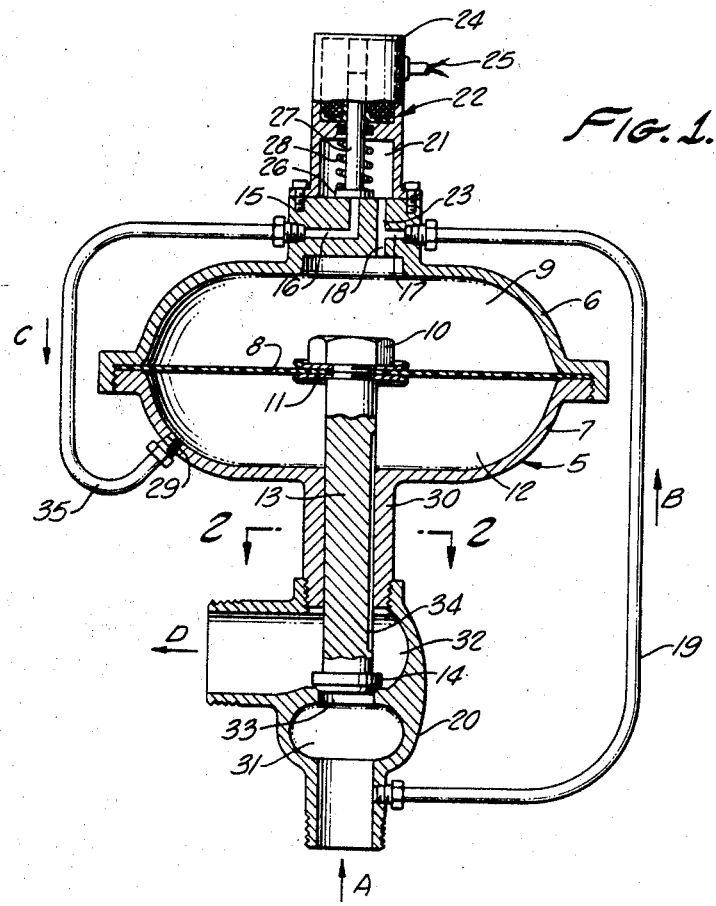
FIG. 1 is an elevational view, partly in section, of a valve illustrating the principles of the present invention.
Figure 2:
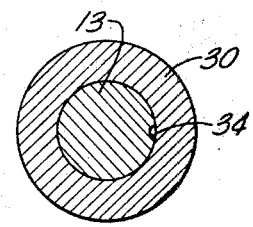
FIG. 2 is a cross-sectional view of the valve of FIG. 1 taken on the line 2—2 thereof.
Figure 3:
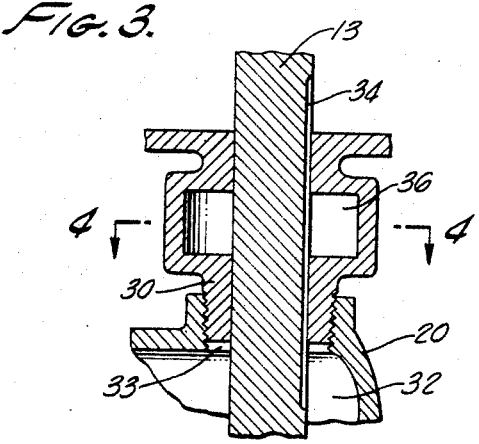
FIG. 3 is an elevational view, in section, of the valve of FIG. 1, but the stem-guide portion of the valve's lower chamber is provided with an accumulation chamber.
Figure 4:
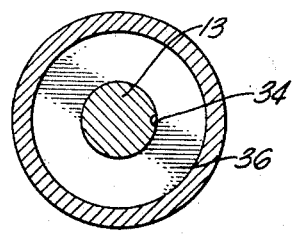
FIG. 4 is a cross-sectional view of the accumulation chamber taken on the line 4—4 of FIG. 3.

Referring more particularly to FIG. 1, the numeral 5 designates generally the fluid control valve comprising an upper shell 6 and a lower shell 7. Shells 6 and 7 may be secured to each other by conventional fastening means. In the illustration of FIG. 1, the lower shell 7 is threadedly engaged by upper shell 6.

A flexible impervious membrane diaphragm 8, internally separates upper shell 6 and lower shell 7 so as to form upper and lower chambers 9 and 12, respectively. Secured to flexible membrane diaphragm 8 by nut and washer means 10 and 11, respectively, is main valve stem 13, which is provided with a valve head 14 at the opposite end thereof. As will hereinafter become obvious, it should be noted that the cross-sectional area of valve head 14 is larger than the cross-sectional area of valve stem 13.

Extending outwardly from upper shell 6 is a head projection 15 which is provided with an exhaust passage 16 and an inlet passageway 17. Inlet passageway 17 is interconnected with upper chamber 9 by connecting passageway 18.

A by-pass line 19 connects the ingress end of coupling 20 with inlet passageway 17 provided by head projection 15 of the upper shell 6. A portion of the line fluid is thus first diverted through by-pass line 19 into inlet passageway 17. The fluid of the system is then simultaneously conducted into chamber 21 of the valve actviating means 22 by connecting passageway 23 and upper chamber 9 of the valve by connecting passageway 18, thereby filling both chambers when exhaust passageway 16 is closed as hereinafter described.

Secured to head projection 15 is valve activating means 22 which, in this case, is an electromagnetic solenoid 24 having electrical line connecting wires 25. Radial flange seat 26 which is carried by control plunger 27 is positioned over the entrance to the exhaust passageway 16 of head projection 15 so as to seal off the exhaust passageway 16 when plunger 27 is in its closed position. The plunger is maintained in its closed position by a coil spring 28 or the like.

Valve activating means 22, which is provided with a hollow chamber 21, may be open at one end as illustrated, or enclosed. Hollow chamber 21 is interconnected with inlet passageway 17 by connecting passageway 23. Thus, hollow chamber 21 provides an enclosed means for a continuous flow of fluid from the inlet passageway 17 through hollow chamber 21 and existing through exhaust passageway 16 when plunger 27 is in its open position. It should be noted that when plunger 27 is maintained in its closed position by coil spring 28 so as to seal off exhaust passageway 16, the fluid accumulating in hollow chamber 21 exerts an additional pressure on radial flange seat 26 of the plunger thereby increasing the effectiveness of the radial flange seat and prohibiting the leakage of fluid from the exhaust passageway.

Lower shell 7 is provided with an inlet port 29 and a hollow stem guide portion 30 which is slideably engaged by main valve stem 13. Stem guide portion 30 is adapted to be secured to the main fluid line by line coupling 20. Coupling 20 is comprised of an ingress chamber and an egress chamber, 31 and 32 respectively, which are interconnected by orifice 33. The stem guide portion 30 of lower shell 7 is secured to the ingress chamber 31 of the coupling 30 so that valve head 14 projects into the cavity of the ingress chamber 31 positioned above orifice 33. When the fluid control valve is closed, the valve head 14 carried by main valve stem 13 seats against orifice 33, thereby prohibiting the flow of the fluid in the system from ingress chamber 31 to egress chamber 32 resulting in an interruption of the fluid flow in the main fluid line.

However, whether main valve stem 13 is in the open or closed position relative to orifice 33 of coupling 20, the lower chamber 12 is interconnected with egress chamber 32 of line coupling 20 by relief drain groove 34. Although drain groove 34 is illustrated herein as a longitudinal slot parallel to the axis of the main valve stem 13, said groove can have a spiral configuration around the circumference of the valve stem 13 or some other suitable configuration. Further, although drain groove 34 is shown carried by main valve stem 13, the groove may be provided on the internal wall of the hollow stem guide portion 30, without deviating from the principles of the invention herein. Relief drain groove 34 is essential to prevent excessive pressure or a vacuum from being created in the lower chamber 12 so that diaphragm 8, and concomitantly main valve stem 13, are permitted to perform their functions. However, it has been found that generally, the smaller the orifice 33 and drain groove 34, the quicker the valve response when shut off, i.e., in the order of 2 to 3 seconds.

Exhaust passageway 16 of head projection 15 is interconnected with inlet port 29 of lower shell 7 by exhaust line 35 thereby permitting the fluid contained in upper chamber 9 to "bleed" into the fluid in lower chamber 12. This is particularly important when the fluid of the system is a liquid since a hydraulic cushion exists in the lower chamber 12 which instantly absorbs the "bleed-off" liquid rather than create an irritating noise which is common with other valve devices. It should be obvious that the cross-sectional area of exhaust line 35 is at least slightly larger than the cross-sectional area of by-pass line 19 to avoid a possible equilibrium condition from occurring in the valve.

The operation of the valve is summarized in the following sequence. Commencing with the valve system in the closed position, fluid enters ingress chamber 31 of coupling 20 (as shown by arrow A). A portion of the fluid is diverted through by-pass line 19 (as illustrated by arrow B) into inlet passage 17 and interconnecting passageways 18 and 23 so as to fill chamber 21 of the valve activating means 22 and upper chamber 9 of the valve 5.

When solenoid 24 of the valve activating means 22 is energized, valve control plunger 27 is raised, thereby permitting the fluid contained in chambers 21 and 9 to flow or "bleed" through exhaust passageway 16 into lower chamber 12 of the valve (as shown by arrow C). Since the amount of fluid entering lower chamber 12 is greater than the amount of fluid passing through relief drain groove 34 carried by main valve stem 13, the fluid pressure in the lower chamber 12 will increase. Because of the line fluid force against the valve head 14 combined with the fluid force increase in lower chamber 12, the amount of fluid in upper chamber 9 is reduced relative to that in the lower chamber 12, flexible membrane diaphragm 8 is caused to be displaced upwardly into upper chamber 9. The upward displacement of diaphragm 8 and the simultaneous displacement of main valve stem 13 upwardly so that the valve head 14 thereof is removed from orifice 33 which connects ingress chamber 31 and egress chamber 32 of coupling 20 thereby permits the fluid from the main line to proceed uninhibited (as illustrated by arrow D).

To stop the flow of fluid along the main line, solenoid 24 is de-energized permitting coil spring 28 to return the valve control plunger 27 to its original position whereby radial flange seat 26 carried thereby is seated over exhaust passageway 16 so as to seal off the same. This action causes the fluid to flow into upper chamber 9 thereby filling the same and increase the fluid pressure therein. Since fluid is constantly draining from lower chamber 12 through drain relief groove 34, when the fluid supplied through exhaust passageway 16 is curtailed by sealing off said exhaust passageway by radial flange seat 26 of valve control plunger 27, the fluid in lower chamber 12 and concomitantly the fluid pressure therein is reduced relative to that in the upper chamber 9. Diaphragm 8, and simultaneously main valve stem 13, are then displaced downwardly so that the valve head 14 carried by said valve stem 13 is seated over orifice 33 thereby prohibiting fluid flow from ingress chamber 31 to egress chamber 32 of coupling 20.

As an alternate embodiment of the present invention, valve stem guide 30 may be provided with an annular cavity 36. When the valve head 14 of main valve stem 13 is seated against orifice 33 so as to seal the same, a back pressure may occur in the main line whereby the drainage of fluid through drain groove 34 is reduced or prohibited, thereby detrimentally retarding the "shut off" response time of the valve system when the solenoid 24 is de-energized.

By providing annular cavity 36, an accumulation chamber is created wherein the fluid drained through drain groove 34 is allowed to accumulate before being subjected to an opposing force resulting from the back pressure in the main line thereby decreasing the "shut off" response time of the valve system when the solenoid 24 is de-energized.

I claim:
1. In a fluid control valve the combination comprising:
a body, said body having an internal hollow cavity;
a flexible impervious diaphragm positioned within said body so as to separate said hollow cavity into an upper and lower chamber;
inlet and exhaust ports provided by said body interconnecting with said upper chamber;
control means seated over said exhaust port so as to close the same;
activating means for removing and returning said control means from its seated position over said exhaust port;
exhaust means interconnecting said exhaust port and said lower chamber;
coupler means capable of conducting fluid secured to said lower chamber for interconnecting said body with a main fluid line;
means carried by said body for obstructing fluid flow through said coupler means, said obstructing means being comprised of a valve stem slideably engaged with said body, said valve stem having an annular flange on one end thereof positioned so as to interrupt the flow of the line fluid through said coupler means, said obstructing means being secured to said flexible diaphragm so as to be displaced simultaneously with the flexing of said diaphragm;
relief drain means interconnecting said lower chamber and said main fluid line at a point in said line subsequent to said obstructing means, said relief drain means comprised of a shallow groove carried by said valve stem, said groove extending from a point on a portion of said stem position in said lower chamber to a point on a portion of said stem positioned in said coupler means, and an annular cavity carried by said body surrounding at least a portion of said stem, said cavity being positioned between said lower body cavity and said coupler means; and
by-pass means interconnecting said upper chamber and said main fluid line at a point in said line preceding said obstructing means for diverting a portion of the line fluid into said upper chamber.

2. In a fluid control valve as described in claim 1, wherein said control means is comprised of a solenoid plunger having a radial flange seat at one end thereof, and said exhaust means is comprised of one or more enclosed passageways.

3. In a fluid control valve as described in claim 1 wherein said activating means is comprised of an electrically operated solenoid for displacing said control means from its seated position and a spring for returning said control means to its original position, and said exhaust means is comprised of one or more enclosed passageways.

4. In a fluid control valve as described in claim 1, wherein said coupler means is comprised of a coupling valve having ingress and egress ends which are secured to the inlet and outlet portions, respectively, of the main line, said ingress and egress ends being interconnected by an orifice opening, and said exhaust means is comprised of one or more enclosed passageways.

5. In a fluid control valve as described in claim 1, wherein said by-pass means is comprised of one or more enclosed passageways, and said exhaust means is comprised of one or more enclosed passageways.

6. In a fluid control valve as described in claim 1, wherein said control means is comprised of a solenoid plunger having a radial flange seat at one end thereof, and said by-pass means is comprised of one or more enclosed passageways.

7. In a fluid control valve as described in claim 1, wherein said activating means is comprised of an electrically operated solenoid for displacing said control means from its seated position and a spring for returning said control means to its original position, and said by-pass means is comprised of one or more enclosed passageways.

8. In a fluid control valve as described in claim 1, wherein said coupler means is comprised of a coupling valve having ingress ends which are secured to the inlet and outlet portions, respectively, of the main line, said ingress and egress ends being interconnected by an orifice opening, and wherein said by-pass means is comprised of one or more enclosed passageways.

9. In a fluid control valve as described in claim 1, wherein said control means is comprised of a solenoid plunger having a radial flange seat at one end thereof, said activating means is comprised of an electrically operated solenoid for displacing said control means from its seated position and a spring for returning said control means to its original position, and wherein said exhaust means is comprised of one or more enclosed passageways.

10. In a fluid control valve as described in claim 1, wherein said activating means is comprised of an electrically operated solenoid for displacing said control means from its seated position and a spring for returning said control means to its original position, said exhaust means is comprised of one or more enclosed passageways, and wherein said coupler means is comprised of a coupling valve having ingress and egress ends which are secured to the inlet and outlet portions, respectively, of the main line, said ingress and egress ends being interconnected by an orifice opening.

11. In a fluid control valve as described in claim 1, wherein said exhaust means is comprised of one or more enclosed passageways, said coupling means is comprised of a coupling valve having ingress and egress ends which are secured to the inlet and outlet portions, respectively, of the main line, said ingress and egress ends being interconnected by an orifice opening, and wherein said by-pass means is comprised of one or more enclosed passageways.

12. In a fluid control valve as described in claim 1, wherein said control means is comprised of a solenoid plunger having a radial flange seat at one end thereof, said coupling means is comprised of a coupling valve having ingress and egress ends which are secured to the inlet and outlet portions, respectively, of the main line, said ingress and egress ends being interconnected by an orifice opening, and wherein said by-pass means is comprised of one or more enclosed passageways.

13. In a fluid control valve as described in claim 1, wherein said control means is comprised of a solenoid plunger having a radial flange seat at one end thereof, said activating means is comprised of an electrically operated solenoid for displacing said control means from its seated position and a spring for returning said control means to its original position, and wherein said by-pass means is comprised of one or more enclosed passageways.

14. In a fluid control valve as described in claim 1, wherein said control means is comprised of a solenoid plunger having a radial flange seat at one end thereof, said exhaust means is comprised of one of more enclosed passageways, and wherein said by-pass means is comprised of one or more enclosed passageways.

15. In a fluid control valve as described in claim 1, wherein said activating means is comprised of an electrically operated solenoid for displacing said control means form its seated position and a spring for returning said control means to its original position, said exhaust means is comprised of one or more enclosed passageways, and wherein said by-pass means is comprised of one or more enclosed passageways.

16. In a fluid control valve as described in claim 1, wherein said control means is comprised of a solenoid plunger having a radial flange seat at one end thereof, said exhaust means is comprised of one or more enclosed passageways, and wherein said coupler means is comprised of a coupling valve having ingress and egress ends which are secured to the inlet and outlet portions, respectively, of the main line, said ingress and egress ends being interconnected by an orifice opening.

17. In a fluid control valve, the combination comprising:
- a body, said body having an internal hollow cavity;
- a flexible impervious diaphragm positioned within said body so as to separate said hollow cavity into an upper and a lower chamber;
- inlet and exhaust ports provided by said body interconnecting with said upper chamber;
- a solenoid plunger having a radial flange seat at one end thereof seated over said exhaust port so as to close the same;
- an electrically operated solenoid for displacing said solenoid plunger from its seated position over said exhaust port and a spring for returning said plunger to its original closed position;
- an enclosed passageway interconnecting said exhaust port and said lower chamber;
- a coupler valve secured to said lower chamber, having the ingress and egress ends thereof secured to the inlet and outlet portions, respectively, of the main line, said ingress and egress ends being interconnected by an orifice opening;
- a valve stem slideably engaged with said body, said valve stem having an annular flange at one end thereof positioned so as to interrupt the flow of the line fluid through said orifice opening provided in said coupler valve, said valve stem being secured at the opposite end thereof to said flexible diaphragm so as to be displaced from said orifice opening simultaneously with the flexing of said diaphragm;
- a shallow groove carried by said valve stem interconnecting said lower chamber and the egress end of said coupler valve, said groove extending from a point on a portion of said stem positioned in said lower chamber to a point on a portion of said stem positioned in said coupler valve;
- an annular cavity carried by said body surrounding at least a portion of said stem, said cavity being positioned between said lower body cavity and said coupler valve; and
- an enclosed passageway interconnecting said upper chamber and said main fluid line at a point in said line preceding said coupler valve for diverting a portion of the line fluid into said upper chamber.

References Cited

UNITED STATES PATENTS

| | | | |
|---|---|---|---|
| 2,516,825 | 7/1950 | Hejduk et al. | 251—122 |
| 2,895,810 | 7/1959 | Casey et al. | |
| 3,112,094 | 11/1963 | Nees et al. | 251—46 X |
| 3,367,621 | 2/1968 | Griswold | 251—46 X |

M. CARY NELSON, *Primary Examiner.*

R. C. MILLER, *Assistant Examiner.*

U.S. Cl. X.R.

251—46